United States Patent [19]

Zuscik

[11] Patent Number: 4,539,259
[45] Date of Patent: Sep. 3, 1985

[54] LAMINATE FOR MAKING TUBES

[75] Inventor: Edward J. Zuscik, Oakland, Calif.

[73] Assignee: Crown Zellerbach Corporation, San Francisco, Calif.

[21] Appl. No.: 627,172

[22] Filed: Jul. 2, 1984

[51] Int. Cl.³ .................... B65D 35/08; B32B 15/08; B32B 27/08

[52] U.S. Cl. .................................... 428/332; 428/35; 428/347; 428/516; 428/520; 428/461; 222/107; 426/127

[58] Field of Search ................. 428/35, 347, 332, 461, 428/516, 520

[56] References Cited

U.S. PATENT DOCUMENTS

| | | | |
|---|---|---|---|
| 4,257,536 | 3/1981 | Hilmar | 428/35 |
| 4,265,948 | 5/1981 | Hayes et al. | 428/35 |
| 4,389,438 | 6/1983 | Ohsuki et al. | 428/35 |
| 4,418,841 | 12/1983 | Eckstein | 428/513 |

Primary Examiner—Patrick C. Ives
Attorney, Agent, or Firm—Stanley M. Teigland

[57] ABSTRACT

The stiffness and deadfold properties of laminates used to make toothpaste tubes are improved by including a layer of high density polyethylene as one of the layers of the laminate. The use of high density polyethylene obviates the need to use a layer of paper or thick foil to provide stiffness and deadfold. The laminates containing high density polyethylene also have excellent strength and other properties which make them especially suitable for making tubes used to package toothpaste or other substances.

7 Claims, 2 Drawing Figures

LAMINATE FOR MAKING TUBES

This invention is a laminate which is especially suitable for manufacturing tubes of the type used to package and dispense such substances as toothpaste. The laminate comprises a heat sealable layer, a first adhesive layer, a barrier layer, a second adhesive layer, a layer of high density polyethylene, and a polymeric outer layer. The laminate has excellent properties, including good stiffness, deadfold, flex crack and stress crack resistance, and strength, including tear strength and impact strength. It is also easy to manufacture and is low in cost.

A key feature of the invention is the use of high density polyethylene (HDPE) to provide good stiffness and deadfold. In prior art constructions, paper and/or metal foil is used to provide stiffness and deadfold. For example, U.S. Pat. No. 4,418,841 discloses a laminate having a construction somewhat similar to the laminate of this invention, but the laminate does not have a layer of HPDE, so it requires a layer of paper, as shown in all the examples, to provide adequate stiffness and deadfold. Paperless laminates for making toothpaste tubes are commercially available, but they do not contain HDPE either, so they contain a layer of metal foil having a thickness of at least 1.5 mil to provide adequate stiffness and deadfold. This invention obviates the need to use paper in the laminate, and permits the use of a thinner layer of metal foil as the barrier layer.

BRIEF DESCRIPTION OF THE DRAWINGS

Referring to FIG. 1, the laminate comprises a heat sealable polymeric layer 10, a first adhesive layer 11, a barrier layer 12, a second adhesive layer 13, a layer of high density polyethylene 14, and a polymeric outer layer 15.

Figure 1:
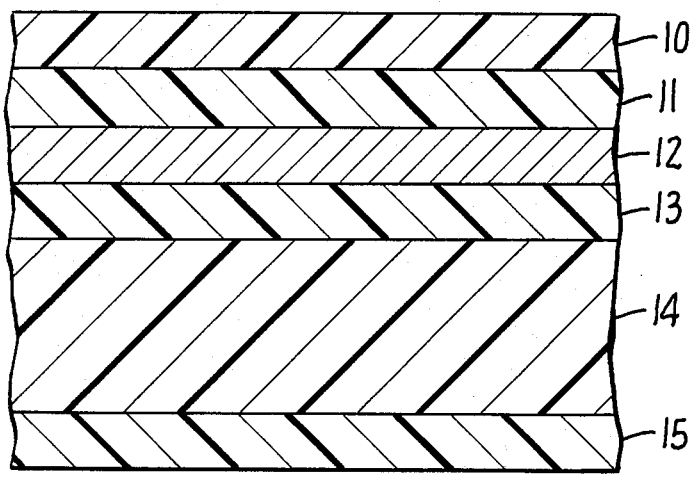
FIG. 1 is a cross section of a preferred embodiments of the laminate of this invention.

The heat sealable polymeric layer 10 is preferably low density polyethylene (LDPE) or linear low density polyethylene (LLDPE). The thickness of the heat sealable layer is preferably between about 0.75 and 3 mils, more preferably between about 1 and 2 mils.

Each adhesive layer 11, 13 preferably comprises an adhesive polymer, such as a copolymer of ethylene and an ethylenically unsaturated carboxylic acid, such as acrylic (EAA) or methacrylic acid (EMAA). The production of carboxylic acid monomer in the polymer is preferably between about 5 and 12 percent by weight. The thickness of each adhesive layer is preferably between about 0.1 and 3 mils, more preferably between about 1 to 2 mils.

The barrier layer 12 is preferably metal foil, such as aluminum foil. The thickness of the foil is preferably between about 0.5 to 1.5 mil, more preferably between 0.75 and 1.25 mil.

The thickness of the layer of high density polyethylene 14 is preferably about one to six mils, more preferably two to five mils, still more preferably three to four mils. The layer is preferably pigmented, preferably with a white pigment, such as titanium dioxide. The amount of pigment in the layer is preferably about 3 to 9 percent by weight. The layer is preferably printed with appropriate indicia, such as brand name and product description. High density polyethylene is polyethylene having a density greater than about 0.94 g/cc. The melt index of the high density polyethylene is preferably between about 0.7 and 1.3.

The polymeric outer layer 15 covering the layer of high density polyethylene is preferably clear low density polyethylene or linear low density polyethylene. Low density polyethylene is a branched chain polymer having a density less than about 0.93. Linear low density polyethylene is a straight chain polymer having a density less than about 0.93 g/cc., usually made by polymerizing ethylene with up to about ten percent by weight of another alpha-olefin having three to fifteen, preferably four to eight, carbon atoms. The thickness of the polymeric outer layer is preferably between about 1 and 3 mils, more preferably between 1.25 and 2 mils.

Other layers may be included in the laminate if desired, but they are not necessary. The laminate preferably consists only of the layers indicated in FIG. 1.

The overall thickness of the laminate is preferably between about 8 to 14 mils, more preferably between about 10 and 12 mils.

The laminate may be manufactured in accordance with methods known in the art, such as the method described in U.S. Pat. No. 3,505,143, except it is not necessary to prime the surfaces as described in the patent.

The laminate may be formed into tubes in accordance with methods known in the art. In such methods, the heat sealable polymeric layer 10 forms a lap seam with the outer polymer layer 15, which forms the outside of the tube. The strength of the heat seal is preferably at least 4 lbs./inch when it is formed at 300° F. and 20 psi for 3 seconds.

EXAMPLES 1-5

Five laminates having the structure shown in FIG. 1 were prepared. The composition and thicknesses of the outer polymeric, heat seal, and adhesive layers were as indicated in Table I below. The barrier layers were aluminum foil having the thicknesses shown in Table I. The layers of high density polyethylene had thicknesses as indicated in Table I and contained about 4% titanium dioxide as pigment. The properties of the laminates are also shown in Table I.

TABLE 1

| Property | Example | | | | |
| --- | --- | --- | --- | --- | --- |
|  | 1 | 2 | 3 | 4 | 5 |
| Outer Polymeric and Heatseal Layers | LDPE | LLDPE | LLDPE | LLDPE | LLDPE |
| Adhesive Layers | EAA | EMAA | EAA | EAA | EAA |
| (mils) | 2.1 (approx) | 2.4 | 2.7 | 2.8 | 2.8 |
| Thickness of HDPE Layer (mils) | 3.8 | 4.1 | 2.6 | 3.1 | 3.6 |
| lb/RM | 50 | 43 | 54 | 48 | 49 |

TABLE 1-continued

| Property | Example | | | | |
|---|---|---|---|---|---|
| | 1 | 2 | 3 | 4 | 5 |
| Thickness of Foil | (approx) 1.0 | 1.0 | 1.5 | 1.0 | 1.0 |
| Overall Thickness, mils | 11.1 | 11.1 | 11.0 | 11.1 | 11.1 |
| Gurley Stiffness, mg | | | | | |
| MD | 670 | 690 | 480 | 530 | 610 |
| CD | 700 | 700 | 540 | 600 | 620 |
| Basis Weight | 181.7 | 186.3 | 192.7 | 179.8 | 189.1 |
| Specific Stiffness | | | | | |
| MD | 3.69 | 3.70 | 2.49 | 2.95 | 3.23 |
| CD | 3.85 | 3.77 | 2.80 | 3.34 | 3.29 |
| Puncture Resistance | | | | | |
| Force, Kg | 15.5 | 14.6 | 13.1 | 13.2 | 14.7 |
| Energy, Kg-in. | 11.9 | 12.8 | 11.7 | 11.5 | 13.3 |
| Dart Impact | NF | NF | NF | NF | NF |
| Elmendorf Tear, g/sheet | | | | | |
| MD | 496 | 640 | 688 | 582 | 685 |
| CD | 614 | 765 | 829 | 736 | 781 |
| Graves Tear, lbs | | | | | |
| MD | 8.8 | 9.3 | 8.5 | 9.0 | 9.9 |
| CD | 9.2 | 8.7 | 8.2 | 8.8 | 9.5 |
| Gelbo Stress Crack | | | | | |
| MD | 54 | 53 | 40 | 60 | 64 |
| CD | 42 | 63 | 46 | 58 | 53 |
| Deadfold Recovery | 80 | 47 | 138 | 117 | 80 |

In Table I, thickness is measured in mils. Gurley stiffness is determined essentially in accordance with the method described in ASTM D747 except a Gurley stiffness tester No. 4171 is used. MD means machine direction and CD means cross direction. Basis weight is the weight in pounds of 3,000 square feet of laminate. Specific stiffness is the Gurley stiffness divided by the basis weight. Puncture resistance is measured on an Instorn tensile tester by forcing a rounded 0.5 inch diameter finger through the center of a 3.25-inch diameter sample at 20 inches/mintue. Dart impact is determined in accordance with ASTM D1709 using a 750 gram dart dropped from a height of 30 inches. NF means none failed. Elmendorf tear strength is determined in accordance with ASTM D1922. Graves tear is determined in accordance with ASTM D1004. Gelbo stress crack is determined using a Gelbo flex tester model 5000 using a 9-inch by 11-inch sample and running at 45 flexes/minute with a four-inch stroke and a 360° angle of rotation. The number of cracks after 20 cycles was determined. Deadfold recovery was determined by creasing a laminate at 1.3 psi for 30 seconds and measuring the recovery angle after five minutes (lower number indicates greater deadfold).

Figure 2:
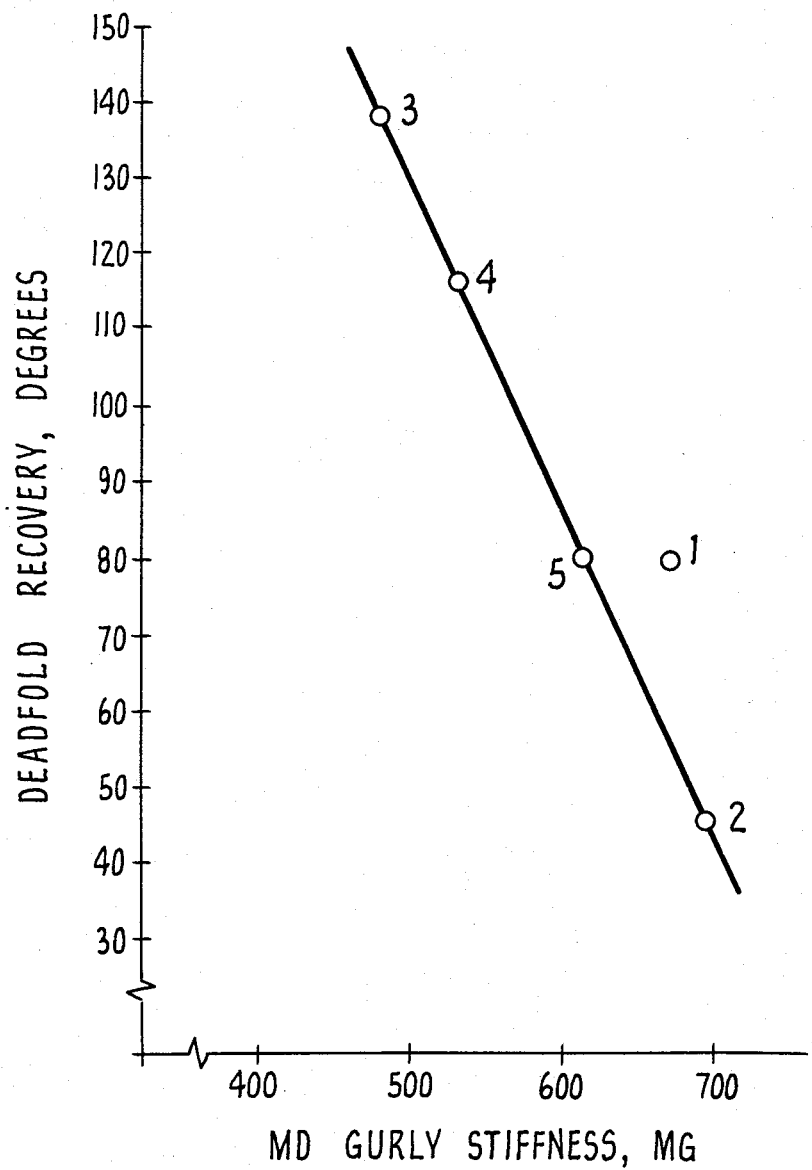
FIG. 2 is a graph showing the relationship between deadfold recovery and Gurley stiffness for laminates of this invention.

The relationship between deadfold recovery and Gurley stiffness of the laminates is shown in FIG. 2, where the numbers of the Examples are shown on the graph. As can be seen from the graph, the best results were obtained with Examples 1, 2 and 5. Better results were obtained in these examples because of the greater thickness of the HDPE layer. As the thickness of the HDPE layer is increased, both the stiffness and deadfold properties of the laminate are improved. Hence, laminates having a desired stiffness and deadfold (e.g. high stiffness and deadfold for large tubes, less stiffness and deadfold for smaller tubes) can easily be made simply by varying the thickness of the HDPE layer. Varying the thickness of the foil layer does not have a similar effect. For example, as shown in FIG. 2, the laminate of Example 4 had better stiffness and deadfold than the laminate of Example 3 even though the laminate of Example 4 had a thinner layer of foil. Hence, the stiffness and deadfold properties obtained with different thicknesses of HDPE are suprising compared to the results obtained with metal foil.

In addition to the properties shown in Table I, the stress crack resistance of the laminate was determined by aging 6-inch by 6-inch samples in an equal mixture by volume of a nonionic surfactant (Igepal) and water at 60° C., making six accordian-like creases in both the machine and cross directions, and inspecting for cracks where the creases intersect. The results are shown in Table II, where the number to the left of the virgule is the number of cracks in the heat sealable layer and the number to the right of the virgule is the number of cracks in the outer layer. "Days" means the number of days of aging.

TABLE II

| | Stress Crack Resistance | | | | |
|---|---|---|---|---|---|
| | Number of Cracks | | | | |
| Days | Ex. 1 | Ex. 2 | Ex. 3 | Ex. 4 | Ex. 5 |
| 1 | 0/0 | 0/0 | 0/0 | 0/0 | 0/0 |
| 4 | 0/0 | 0/0 | 0/0 | 0/0 | 0/0 |
| 5 | 2/3 | 1/3 | 3/4 | 1/3 | 2/0 |
| 12 | 2/5 | 1/1 | 3/4 | 1/4 | 3/4 |

These examples demonstrate that the laminates of this invention have excellent stiffness, deadfold, strength, and stress crack resistance. In preferred embodiments the laminates have a Gurley stiffness of at least 600 mg., a deadfold recovery of less than 85 degrees, and puncture resistance energy of more than 11.5 kg-in. The laminates also have good bond strength between layers. In the Example the bond strength between each pair of adjacent layers was at least 600 grams/inch.

Incorporating a layer of HDPE in the laminate improves the stiffness and deadfold of the laminate, and by varying the thickness of the HDPE layer, the stiffness and deadfold can easily be tailored for a particular application. Hence, the laminates are especially suitable for making tubes for dispensing substances packaged therein, particularly toothpaste. However, the tubes can be used to package other substances, including other toiletries, such as shampoo, as well as adhesive, food, drugs, and the like.

I claim:

1. In a laminate suitable for forming a tube used to dispense a substance packaged therein, the laminate comprising a heat sealable polymeric layer, a first adhesive layer, a layer of metal foil, a second adhesive layer, a layer providing stiffness and deadfold properties, and an outer polymeric layer, the improvement wherein the layer providing stiffness and deadfold properties is a layer of high density polyethylene.

2. The improvement of claim 1 wherein the high density polyethylene contains a pigment.

3. The improvement of claim 1 wherein the thickness of the layer of high density polyethylene is between about two and five mils.

4. The laminate of claim 3 wherein the adhesive layers comprises a copolymer of ethylene and an ethylenically unsaturated carboxylic acid.

5. The laminate of claim 4 wherein the heat sealable polymeric layer and the outer polymeric layer comprise low density olyethylene or linear low density polyethylene.

6. The laminate of claim 7 having a Gurley stiffness greater than about 600 mg and a deadfold recovery of less than about 85 degrees.

7. The laminate of claim 6 having a thickness between about 8 and 14 mils.

* * * * *